United States Patent
Gottlieb

(10) Patent No.: US 9,820,557 B2
(45) Date of Patent: Nov. 21, 2017

(54) FLUID STORAGE AND TUBE UNIT AND METHOD OF USE

(71) Applicant: Robert G. Gottlieb, Houston, TX (US)

(72) Inventor: Robert G. Gottlieb, Houston, TX (US)

( * ) Notice: Subject to any disclaimer, the term of this patent is extended or adjusted under 35 U.S.C. 154(b) by 0 days.

(21) Appl. No.: 14/599,626

(22) Filed: Jan. 19, 2015

(65) Prior Publication Data

US 2016/0206082 A1    Jul. 21, 2016

(51) Int. Cl.
*A45F 3/16* (2006.01)
*B65D 47/32* (2006.01)
*B62J 99/00* (2009.01)
*B65D 47/06* (2006.01)

(52) U.S. Cl.
CPC .................. *A45F 3/16* (2013.01); *B62J 99/00* (2013.01); *B65D 47/06* (2013.01); *B65D 47/32* (2013.01); *A45F 2003/166* (2013.01)

(58) Field of Classification Search
CPC ....... A45F 2003/166; A45F 3/16; B62J 99/00; B65D 2547/066; B65D 47/06; B65D 47/24; B65D 47/243; B65D 47/32
USPC ..................................... 222/175, 181.1, 610
See application file for complete search history.

(56) References Cited

U.S. PATENT DOCUMENTS

| | | |
|---|---|---|
| 4,095,812 A | 6/1978 | Rowe |
| 4,815,635 A * | 3/1989 | Porter .................... B62J 11/00 222/136 |
| 4,976,364 A | 12/1990 | Solomon |
| 5,029,719 A | 7/1991 | Solomon |
| 5,158,218 A * | 10/1992 | Wery ...................... B62J 11/00 222/181.1 |
| 5,215,231 A | 6/1993 | Paczonay |
| 5,301,858 A * | 4/1994 | Hollander ............... B62J 11/00 224/148.2 |
| 5,301,860 A | 4/1994 | Paczonay |
| 5,607,087 A * | 3/1997 | Wery .................. B67D 1/0456 222/401 |
| 5,715,863 A * | 2/1998 | Paczonay ................. A45F 3/16 137/512 |
| 6,199,729 B1 * | 3/2001 | Drzymkowski .......... A45F 3/20 138/120 |
| 6,513,686 B1 * | 2/2003 | Ben-Sasson ......... B60N 2/4876 215/388 |
| 6,666,360 B1 * | 12/2003 | Swank ..................... A45F 3/20 222/175 |
| 6,953,135 B2 * | 10/2005 | Litton ..................... B62J 9/001 224/414 |
| 8,317,058 B2 | 11/2012 | Toth et al. |
| 8,777,075 B2 * | 7/2014 | Bretl ........................ A45F 3/16 224/148.2 |
| 2002/0092858 A1 * | 7/2002 | Bowman ................... A45F 3/16 220/709 |
| 2003/0098324 A1 | 5/2003 | Litton et al. |

(Continued)

FOREIGN PATENT DOCUMENTS

WO    WO 0130685 A1 *  5/2001  ............. A01K 7/00

*Primary Examiner* — Nicholas J Weiss
(74) *Attorney, Agent, or Firm* — Ira Domnitz

(57) ABSTRACT

A fluid containment system that comprises a fluid container with a top, with an orifice and a wall extending from the bottom, a junction cap that can be mechanically attached to the extended wall, a tube leading from the junction cap, and a mouth piece attached distal to the junction on the tube suitable for an end user to draw fluid from the fluid container.

1 Claim, 7 Drawing Sheets

(56) References Cited

U.S. PATENT DOCUMENTS

| | | | | |
|---|---|---|---|---|
| 2008/0006718 A1* | 1/2008 | Junkel | A45F 3/16 | |
| | | | | 239/333 |
| 2008/0296317 A1* | 12/2008 | Baker | A45C 13/30 | |
| | | | | 222/175 |
| 2010/0072232 A1* | 3/2010 | Rider | B62J 11/00 | |
| | | | | 222/610 |
| 2012/0145726 A1* | 6/2012 | Sae | A45F 3/16 | |
| | | | | 220/703 |
| 2013/0214007 A1* | 8/2013 | Simonian | B65D 51/1644 | |
| | | | | 222/189.06 |

* cited by examiner

FLUID STORAGE AND TUBE UNIT AND METHOD OF USE

CROSS-REFERENCE TO RELATED APPLICATIONS

Not applicable.

STATEMENT REGARDING FEDERALLY SPONSORED RESEARCH

Not applicable

BACKGROUND

The present invention, and inventive system, is a new and novel invention that works as a fluid container and transfer mechanism that can be attached, in some embodiments to a frame, such as a bicycle frames, or other devices in which a fluid container can be attached, or, in some embodiments, carried on a person via a belt supported carrier or in a back pack or on a shoulder harness or in a clothing pocket. The present invention is an improvement over existing water bottles as the present invention utilizes a fluid container with the fluid tube egressing from the bottom of the fluid container and traversing to the mouth piece attached to the end user.

SUMMARY

In several embodiments of the present invention, the present invention operates under several parameters.

In many embodiments of the present invention, the present invention comprises a fluid container, with an orifice on both the top and the bottom of the fluid container, wherein the top orifice may be fitted with a port suitable for filling and/or a valve suitable for venting the fluid container, the bottom orifice suitable for attachment of a junction cap (depending on the material making up the fluid container the valve and the junction cap may be threadably attached, welded, glued or compression fitted to the container), a tube attached to the junction, and a mouth piece attached distal to the junction on the tube suitable for an end user to draw fluid from the fluid container. A filling port may be the same device as the venting valve or may be a different device.

In many embodiments of the present invention, the present invention comprises a fluid container with an orifice on both the top and the bottom of the fluid container, wherein the top orifice is suitable to be fitted with a valve to vent the fluid container, the bottom orifice suitable for attachment of a filling port or valve and is suitable for attachment of a junction cap (depending on the material making up the fluid container the valve, junction and port may be threadably attached, welded, glued or compression fitted to fluid container), a tube attached to the junction, and a mouth piece attached distal to the Junction on the tube suitable for an end user to draw fluid from the fluid container.

In many embodiments of the present invention, the present invention comprises a fluid container with an orifice on both the top and the bottom of the fluid container, a third orifice located elsewhere on the fluid container, wherein the top orifice is suitable to be fitted with a valve to vent the fluid container, the bottom orifice suitable for attachment of a junction cap, and the third orifice is suitable for the attachment of a filling port or valve (depending on the material making up the fluid container the valve, junction and port may be threadably attached, welded, glued or compression fitted to fluid container), a tube attached to the junction, and a mouth piece attached distal to the junction on the tube suitable for an end user to draw fluid from the fluid container.

In many embodiments of the present invention, the present invention comprises a fluid container with a removable top, the removable top further comprising a port for attachment of a venting valve, a fluid container with an orifice on bottom, a Junction cap that can be attached to the orifice, a tube leading from the junction, at least one loop and hook attachment for attaching to the tube leading from the junction, and a mouth piece attached distal to the junction on the tube suitable for an end user to draw fluid from the fluid container. Depending on the materials used in the construction of the fluid container, the attachment of the vent valve and the junction may be made using a threaded connection, a welded connection, a glued connection, a compression fitted connection or any other appropriate mechanical connection.

In many embodiments of the present invention, the present invention comprises a fluid container with a removable top, the removable top further comprising a port for attachment of a venting valve, a screw on bottom for the fluid container with an orifice and a threaded wall extending from the screw on bottom, a junction cap that can be threadably attached to the threaded wall, a tube leading from the junction, at least one loop and hook attachment for attaching to the tube leading from the junction, and a mouth piece attached distal to the junction on the tube suitable for an end user to draw fluid from the fluid container.

In many embodiments of the present invention, the present invention the fluid container is molded to fit into a bicycle water bottle rack. In several embodiments of the present invention the fluid container is molded to fit into a bicycle water bottle rack, wherein the tube of the present invention will be held in place by the bottle rack but not pinched or compromised by the bottle rack. In many embodiments of the present invention the loop and hook attachments can attach to a user's shirt or helmet. Although it is envisioned that the loop and hook attachments could attach to other parts of an end user.

In many embodiments of the present invention the present invention is assembled in substantially the following manner. The fluid container with an orifice and a threaded wall extending from the screw on bottom is mechanically and threadably attached to the junction cap via the threaded wall. At least one loop and hook attachment for attaching to the tube leading from the junction is placed over the tube. A mouth piece is attached distal to the junction on the tube suitable for an end user to draw fluid from the fluid container.

In many embodiments of the present invention the present invention is assembled in substantially the following manner. The screw bottom of the fluid container with a removable top is screwed onto the bottom of the fluid container. At this point the screw on bottom for the fluid container with an orifice and a threaded wall extending from the screw on bottom is mechanically and threadably attached to the Junction cap via the threaded wall. At least one loop and hook attachment for attaching to the tube leading from the junction is placed over the tube. A mouth piece is attached distal to the Junction on the tube suitable for an end user to draw fluid from the fluid container.

In many embodiments of the present invention the present invention may be used in substantially the following manner. After the present invention is assembled, it can be filled with fluid. Once the fluid container is filled, it can be inserted into a water bottle rack on, by way of example, a bicycle, such that the tube fits into a molded area of the fluid container and is not pinched by the arms of the water bottle rack or the bicycle frame, and fluid can flow from the fluid container through the tube when in use. Once, in the bottle rack the user can attach the loop and hook attachments on the tube and attach them to their shirt, helmet or other area therein allowing the mouthpiece to be in easy reach of a user. The user could access the mouthpiece without using their hands. Once the mouthpiece is in the users mouth the user need only utilize a standard sucking motion in order to draw fluid from the fluid container.

In some of the present invention, the present invention the present invention comprises a fluid containment system comprising: a fluid container with a top with an orifice and a wall extending from bottom on said fluid container; a junction cap that can be mechanically attached to the wall; a tube leading from said junction; and a mouth piece attached distal to the junction on the tube suitable for an end user to draw fluid from the fluid container. I some embodiments said fluid container with a top further comprises an attachable bottom for the fluid container with an orifice and a wall extending from said bottom. In some embodiment said fluid container with an attachable top further comprises a port for the attachment of a pressure relief vent. In some embodiments said at least one attachment is a loop and hook attachment. In some embodiments said junction is comprised of geometric shape. In some embodiments said loop and hook attachments is attached to a frame. In some embodiments said loop and hook attachments is attached to a user's shirt. In some embodiments said tube can loop over a user's back.

In some embodiments of the present invention the resent invention comprises: a method for using a fluid containment system comprising the steps of assembling the fluid containment system comprising; a fluid container with a top with an orifice and a wall extending from a bottom on said fluid container; a junction cap that can be mechanically attached to the extended wall; a tube leading from the junction; and, a mouth piece attached distal to the junction on the tube suitable for an end user to draw fluid from the fluid container; filling said fluid container with fluid placing said mouthpiece into the mouth of said user; and drawing fluid from the filled fluid container through said mouth piece. In some embodiments said fluid container with a top further comprises an attachable bottom for the fluid container with an orifice and a wall extending from said attachable bottom; filling said fluid container with fluid; placing said mouthpiece into the mouth of said user; and drawing fluid from the filled fluid container through said mouth piece.

In some embodiments of the present invention, the present invention comprises: a fluid containment system assembled in the following manner: mechanically attaching a fluid container with an orifice and a wall extending from the via the extended wall; attaching a tube to said junction cap; and, attaching a mouth piece attached distal to the Junction on the tube suitable for an end user to ingest and draw fluid from the fluid container. In some embodiments said fluid container with an orifice has a wall extending from an attachable bottom mechanically attached to the fluid container.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
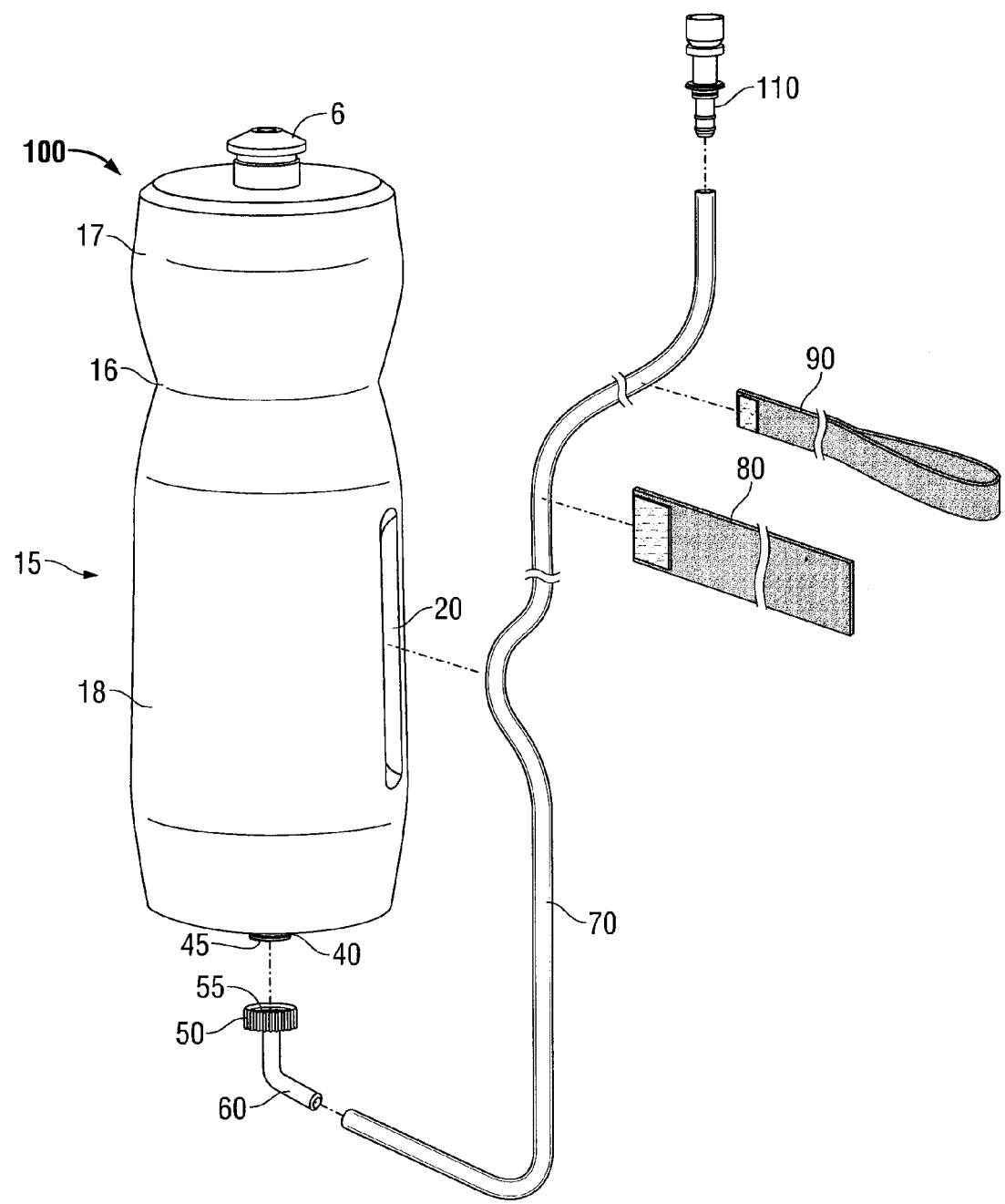
FIG. 1 illustrates one embodiment of the present invention in exploded view.

In the following description, certain details are set forth such as specific quantities, sizes, etc. . . . so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing particular embodiments of the disclosure and are not intended to be limiting thereto. Drawings are not necessarily to scale.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 11th Edition, 2008. Definitions and/or interpretations should not be incorporated from other patent applications, patents, or publications, related or not, unless specifically stated in this specification or if the incorporation is necessary for maintaining validity.

One, or more, illustrative embodiments incorporating the invention disclosed herein are presented below. Applicants have created a revolutionary and novel system and method of storing and extracting fluid from a portable fluid container.

In many embodiments of the present invention, the present invention comprises a fluid container with a top, an orifice and a threaded wall extending from the screw on bottom, a junction cap that can be threadably attached to the threaded wall, a tube leading from the junction, optionally at least one loop and hook attachment for attaching to the tube leading from the junction, and a mouth piece attached distal to the junction on the tube suitable for an end user to draw fluid from the fluid container. In several embodiments of the present invention the junction maybe "L", "J" or other premolded shape. In several embodiments of the present invention, the wall extension may be molded into the bottom of the container such that the junction is created by mechanically attaching the tube directly to the wall extension rather than using a threaded wall. In several embodiments of the present invention the top maybe removable in a manner known in the art.

FIG. 1 illustrates one embodiment of the present invention in exploded view. In this view, the present invention is a fluid storage and retrieval container unit 100. In several preferred embodiments, container unit 100 comprises at least a fluid container 15 with a top with an orifice and a wall 45 extending from the bottom 18, a junction cap 50 that can be attached to the wall 45, a tube 70 leading from the junction, and a mouth piece 110 attached distal to the junction on the tube suitable for an end user to draw fluid from the fluid container unit 100. In addition, the tube 70 may optionally have one or more loop(s) 80 attached to be used to secure the tube while in use. In several embodiments of the present invention the junction cap 50 maybe "L", "J" or other premolded shape. In several embodiments of the present invention the top maybe removable in a manner known in the art. (See FIG. 2). In many embodiments of the present invention, the wall 45 may be threaded or molded in such a manner as to mechanically interact with the junction cap 50. Depending upon the materials used to manufacture the container the connection between the junction 60 and the wall extension 45 may be made by using threads, glue, welds or a compression fitting. Depending on the materials used the attachment to the container 15 may be accomplished by threads, welds, glue, compression or other mechanical attachments.

FIG. 1 illustrates the fluid container 15. Fluid container 15 can be made of a comparable material to other water bottles, used in the art. As shown, fluid container 15 may be constructed in several embodiments of the present invention with a beveled upper portion 17, an indented middle portion 16, and a beveled lower portion 18. In several embodiments of the present invention the lower portion 18 has a further molded indentation 20, which may run the length of the lower portion 18, or run only a portion of the length of 18. In many preferred embodiments of the present invention, it is envisioned that the upper portion 17 and lower portion 18 are greater in radius than the indented portion 16. In several embodiments of the present invention, the upper portion 17, the indented portion 16 and the lower portion 18 can be in variant radii as compared with each other, or can all have substantially the same radius, but for the indentation 20 molded into the side of lower portion 18. Fluid container 15 may be comprised of plastic, resin, or other comparable material, such as a metal, or other solid material. Fluid container 15, in several embodiments of the present invention, can be molded directly as a unit with varying sizes of the lower portion 18, the upper portion 17, the indented portion 16, and the indentation 20 during the formation of the fluid container 15.

FIG. 1 also illustrates a threaded wall 40 as can be found in some embodiments of the present invention. When threaded, wall 40 is preferably constructed so as to be able to enter into threadable communication with the junction cap 50 when the present inventive unit 100 is assembled. FIG. 1 also illustrates one embodiment of the junction cap 50. Although illustrated as a junction, it is envisioned that the tube 60 can be shaped in a variety of geometric forms, including, but not limited to an "L", "J", "U" or other shape. The wall 40 may be constructed with limited or no threading, so long as the wall 40 can enter into mechanical communication with junction cap 50 or even directly with the tube 70. Also illustrated in FIG. 1 is the tube 70 which can enter into mechanical communication with the tube 60 in such a manner are to form a fluid tight seal. Tube 70 maybe comprised of plastic, resin, metal, or other comparable material and maybe in variable length.

FIG. 1 also illustrates the optional attachment systems 80 and 90 to the present invention. As illustrated the attachment systems 80 and 90 can be constructed of a hook and loop attachment material, although any other easy break away attachment systems could be utilized. At the end of the tube 70 distal to the tube 60 is a mouth piece 110 which is known in the art for use in extracting fluids from a tube. Depending on the materials used for the fluid container, the tube to tube attachments can be glued welded, threadably attached or compression fitted.

Figure 2:
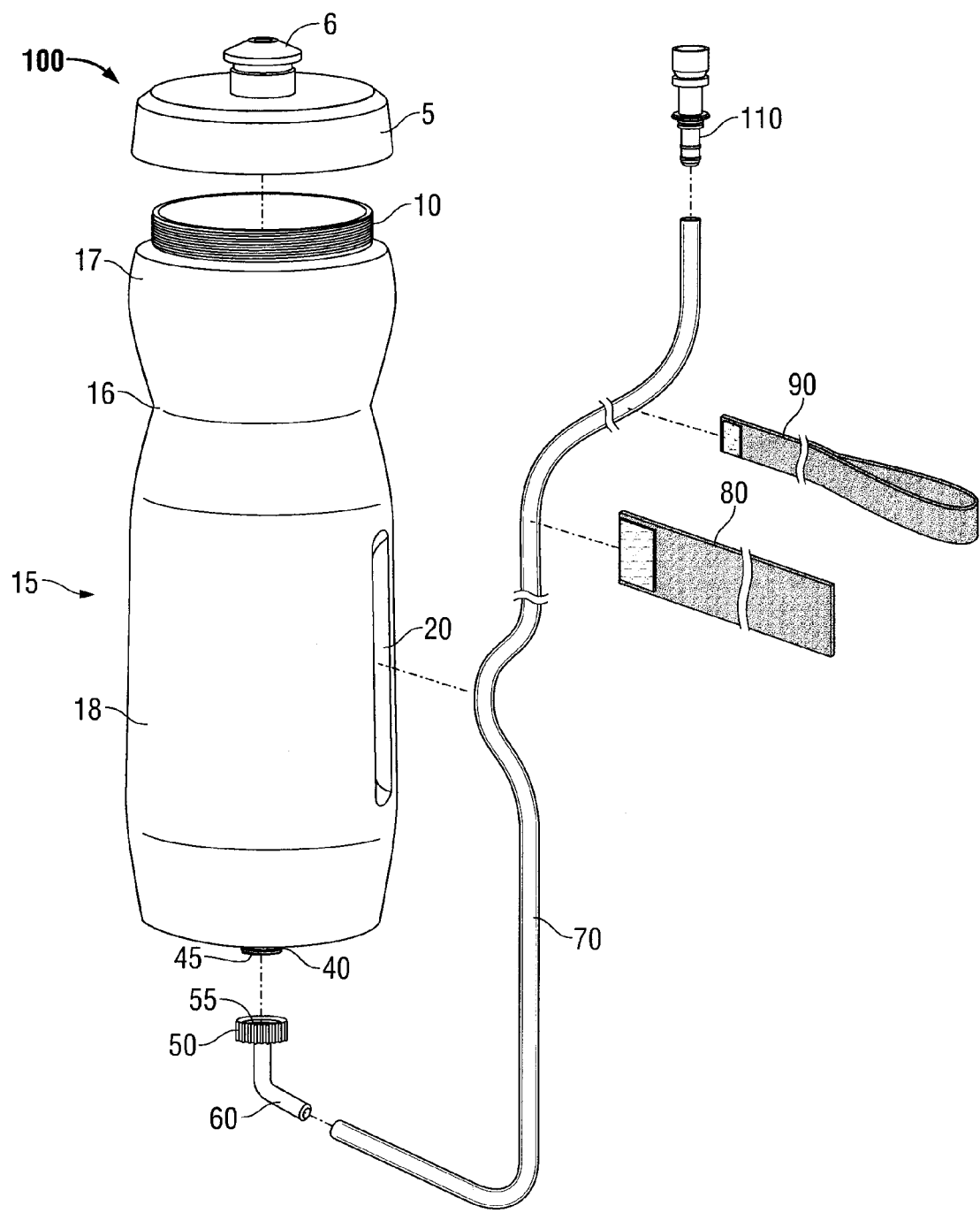
FIG. 2 illustrates one embodiment of the present invention in an exploded view.

FIG. 2 illustrates the one embodiment of the present invention similar to FIG. 1 with the modification of a removable top 5. Top 5 can be made of a comparable material to other water bottles, used in the art. Although illustrated as a screw top, attachable to the fluid container 15 via threads 10, in some embodiments of the present invention removable top 5 can be substantially a pop on top. As shown, top 5 is preferable comprised with a pressure equalizing orifice 6. The pressure equalizing orifice 6 can be of a pop top, or other pressure equalizing orifice as is known in the industry. Top 5 may be comprised of plastic, resin, or other comparable material.

Figure 3:
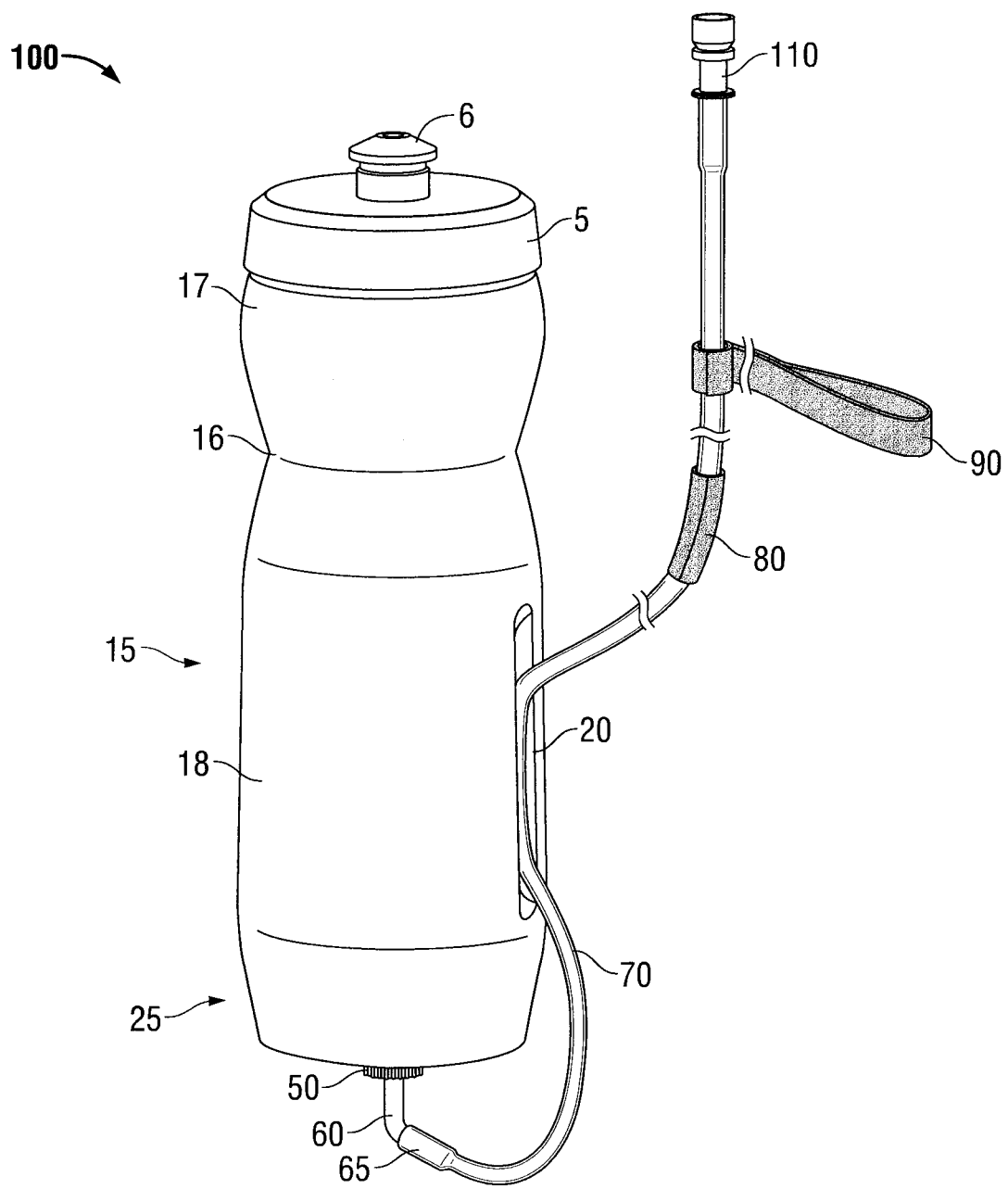
FIG. 3 illustrates one embodiment of the present invention in assembled view.

FIG. 3 illustrates one embodiment of the present invention similar to FIG. 2 in assembled form. It is envisioned that the container unit can be attached to a frame, housed in a back pack, or carried in any other manner know in the art by an end user.

Figure 4:
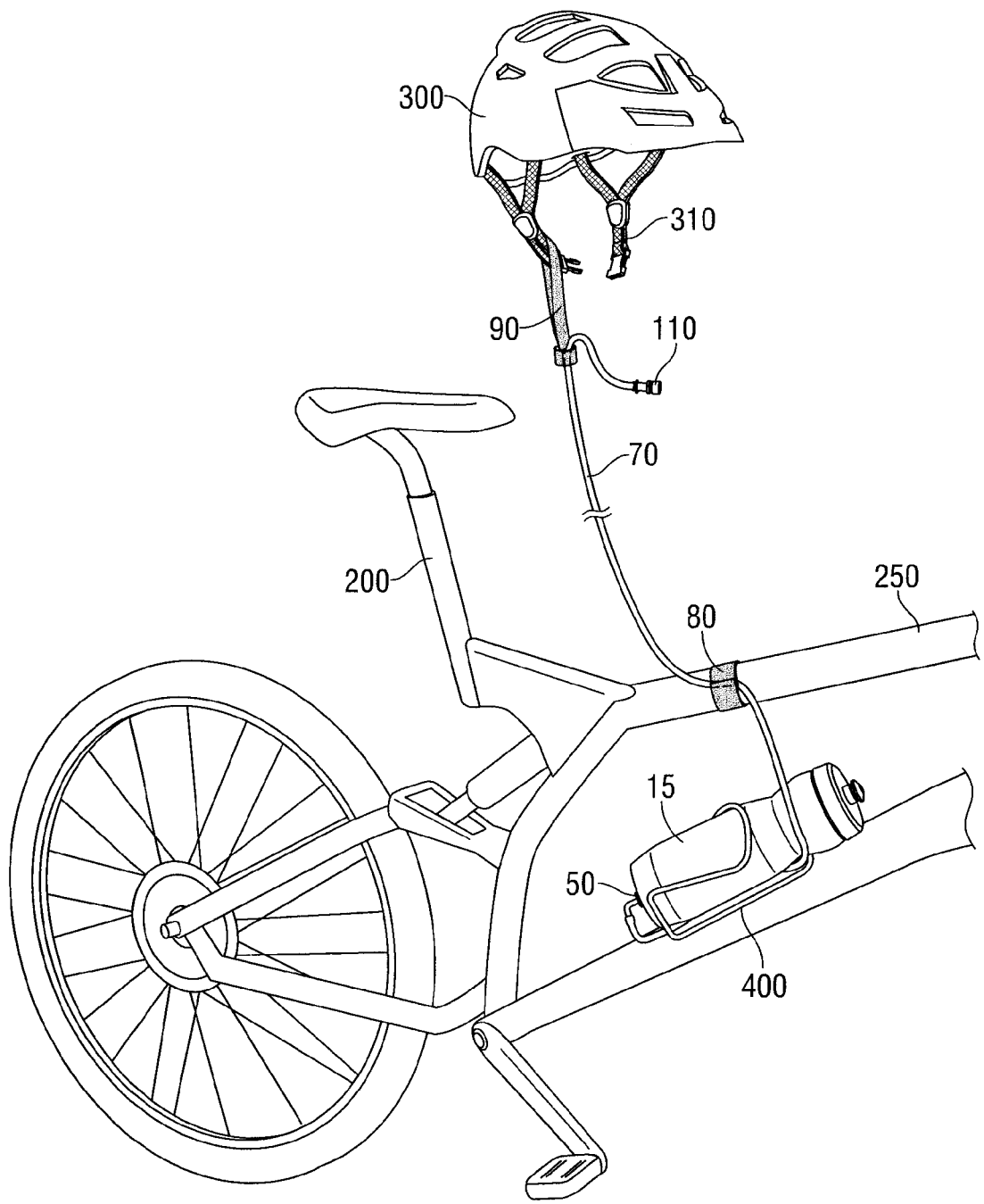
FIG. 4 illustrates one embodiment of the present invention in assembled view as attached to a bicycle frame.

FIG. 4 illustrates several embodiments of the container unit 100 attached to a bicycle frame. Other forms of attachment to a frame could be exercised by the user. The container unit is attached to the bicycle frame 250 by a frame clip unit 400. The tube 70 is attached to the container unit and threaded through and attached to the frame 250 by the attachment 80. The tube 70 extends upward above the frame 250 and is attached to the chinstrap 310 of the helmet 300 by the attachment 90. The mount piece is connected to the tube 70 distal from the container unit 100.

Figure 5:
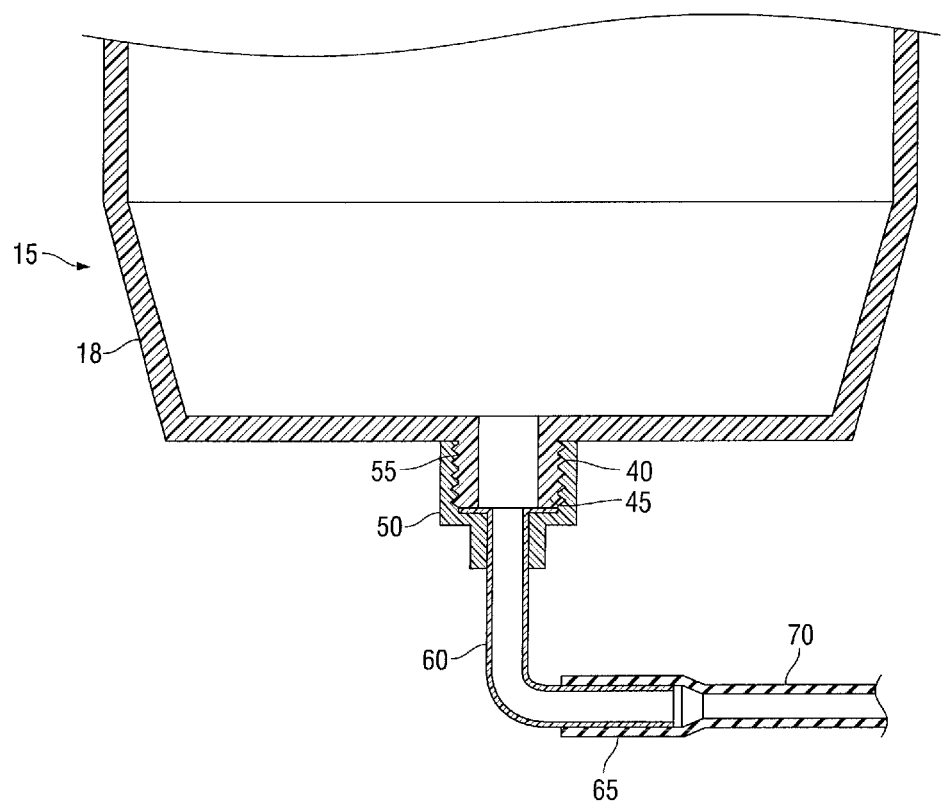
FIG. 5 illustrates one embodiment of the present invention in cross sectional view of the threaded wall and junction.

FIG. 5 illustrates an embodiment of the container unit, wherein the tube 60 is threadably attached to the lower portion 18 of the fluid container 15. In this embodiment the tube 70 is shown attached to the tube 60 via a compression joint. Tube 60 is shown protruding through the junction cap 50 leaving an expanded portion around the interior of the cap where the expanded portion sits between the interior of the junction cap 50 and the end of wall 45 which extends from the bottom portion 18 of the fluid container 15. In several embodiments, the threads 55 on the interior of the junction cap 50 intertwine and mate with the treads 40 on the exterior of the wall 45. As the threads are tightened, the end of wall 45 and the interior of junction cap 50 compress the extended portion of the tube 60 forming a fluid tight seal.

Figure 6:
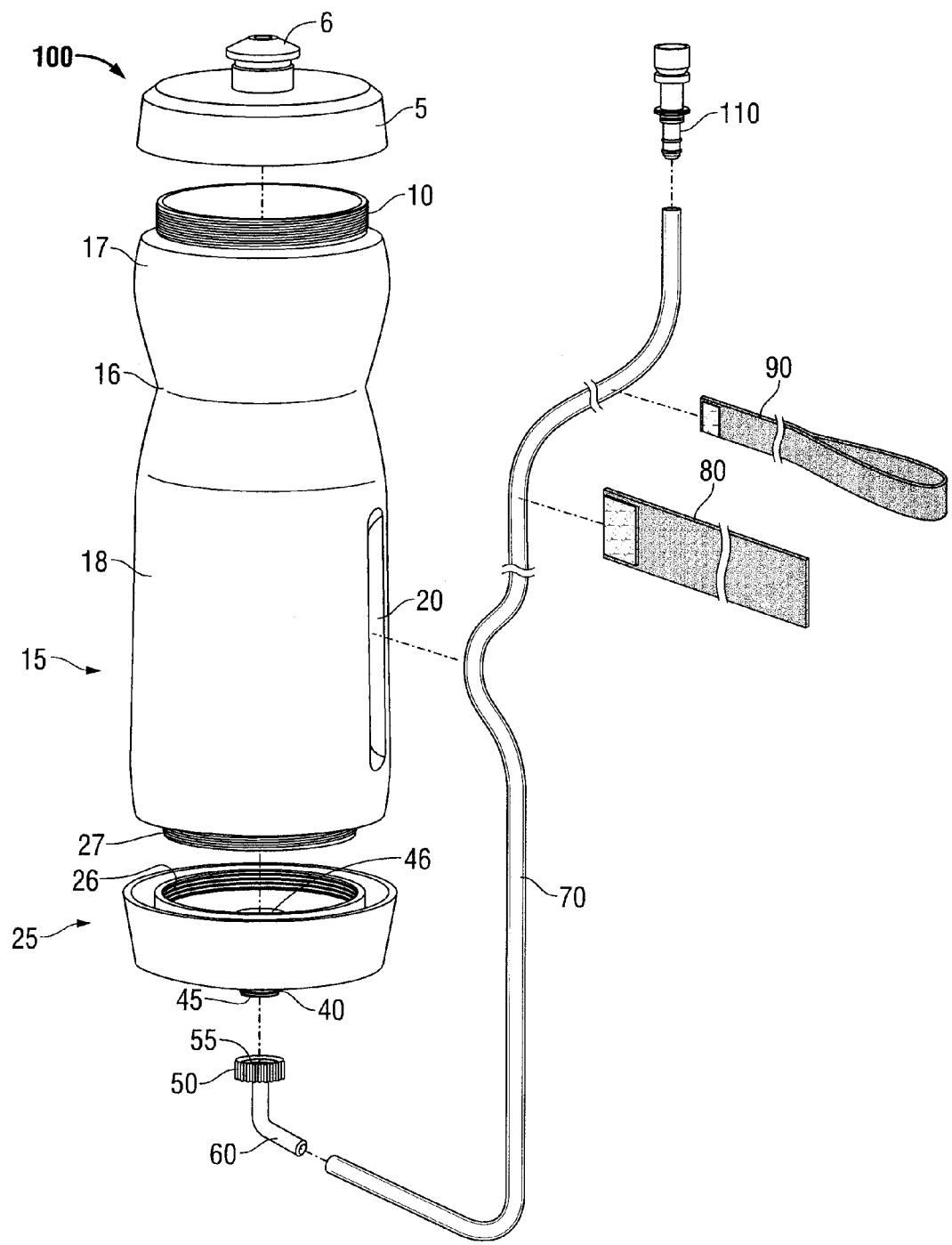
FIG. 6 illustrates one embodiment of the present invention in exploded view with a screw on bottom cap: and, FIG. 7 illustrates one embodiment of the present invention in assembled view.

FIG. 6 illustrates one embodiment of the present invention in exploded view. In this view, the present invention is a fluid storage and retrieval container unit 100. In several preferred embodiments, container unit 100 comprises at least a fluid container 15 with a removable top 5, a screw on bottom for the fluid container 25 with an orifice and a threaded wall extending from the screw on bottom 45, a junction cap 50 that can be threadably attached to the threaded wall 40, a tube 70 leading from the junction, at least one loop and hook attachment 80 for attaching to the tube leading from the junction, and a mouth piece 110 attached distal to the junction on the tube suitable for an end user to ingest and draw fluid from the fluid container unit 100.

FIG. 6 illustrates the removable top 5. Top 5 can be made of a comparable material to other water bottles, used in the art. Although illustrated as a screw top, attachable to the fluid container 15 via threads 10, in some embodiments of the present invention removable top 5 can be substantially a pop on top. As shown, top 5 is preferable comprised with a pressure equalizing orifice 6. The pressure equalizing orifice 6 can be of a pop top, or other pressure equalizing orifice as is known in the industry. Top 5 may be comprised of plastic, resin, or other comparable material.

FIG. 6 illustrates the fluid container 15. Fluid container 15 can be made of a comparable material to other water bottles, used in the art. Although illustrated as a screw top, attachable to the top 5 via threads 10, in some embodiments of the present invention fluid container 15 can be substantially a pop on top variety. As shown, fluid container 15 may be constructed in several embodiments of the present invention with a beveled upper portion 17, an indented middle portion 16, and a beveled lower portion 18. In several embodiments of the present invention the lower portion 18 has a further molded indentation 20, which may run the length of the lower portion 18. In many preferred embodiments of the present invention, it is envisioned that the upper portion 17 and lower portion 18 are greater in radius than the indented portion 16. In several embodiments of the present invention, the upper portion 17, the indented portion 16 and the lower portion 18 can be in variant radii as compared with each other, or can all have substantially the same radius, but for the indentation 20 molded into the side of lower portion 18. Fluid container 15 may be comprised of plastic, resin, or other comparable material. Fluid container 15, in several embodiments of the present invention, can be molded directly as a unit with varying sizes of the lower portion 18, the upper portion 17, the indented portion 16, and the indentation 20 during the formation of the fluid container 15.

In several embodiments of the present invention, the fluid container can be pre-molded with a sold bottom FIG. 1, or with a screw bottom 25, as presently illustrated, in FIG. 6. As illustrated in FIG. 6, the screw bottom 25 is preferably constructed with an orifice with a threaded wall 40 exuding from the lower portion 26 of the screw bottom 25. Screw bottom 25 may be comprised of plastic, resin, or other comparable material. In several embodiments of the present invention, the screw bottom 25 is designed to screw onto threads on the lower end of the fluid container 15, on the same end of the lower portion 18. In several embodiments of the present invention, it is preferable that the screw bottom 25 is preferably designed to thread onto the fluid container 15 so that the two when assembled form substantially as fluid proof sealing between fluid container 15 and screw bottom 25.

FIG. 6 also illustrates the threaded wall 40 on the bottom side of the screw bottom 25. Threaded wall 40 is preferably constructed so as to be able to enter into threadable communication with the junction cap 50 when the present inventive unit 100 is assembled. The screw bottom 25 may be constructed, in several embodiments, with a threading 26 that can mechanically engage and interact with the corresponding threading 27 on the fluid container 15, such that when assembled, the screw bottom 25 and the fluid container 15 will be in mechanical communication such that the they will from a leakless seal at the screw bottom 25 and fluid container 15 juncture.

FIG. 6 also illustrates one embodiment of the junction cap 50. Although illustrated as an "L" shaped junction, it is envisioned that the tube 60 may be shaped in a variety of geometric forms, including, but not limited to an "L", "J", "U" or other shape. The threaded wall 40 may be constructed with limited or no threading, so long as the threaded wall 40 can enter into mechanical communication with junction cap 50. Also illustrated in FIG. 1 is the tube 70 which can enter into mechanical communication with the tube 60 in such a manner are to form a fluid tight seal attachment 65. Tube 70 maybe comprised of plastic, resin, metal or other comparable material and maybe in variable length.

FIG. 6 also illustrates the optional attachment systems 80 and 90 As illustrated the attachment systems 80 and 90 can be constructed of a hook and loop attachment material, although any other easy break away attachment systems could be utilized. At the end of the tube 70 distal to the tube 60 is a mouth piece 110 which is known in the art for use in extracting fluids from a tube.

Figure 7:
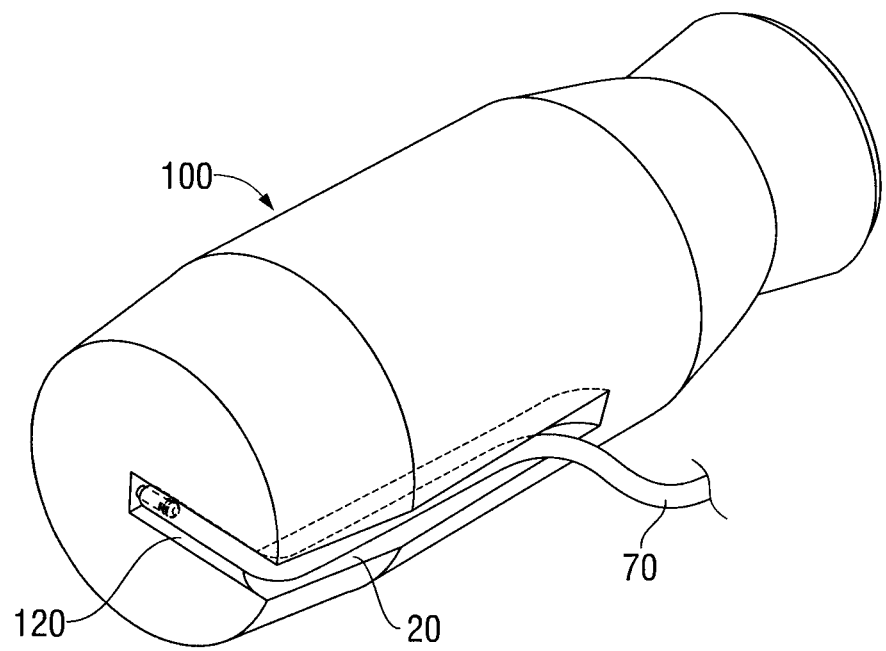
Figure 8:
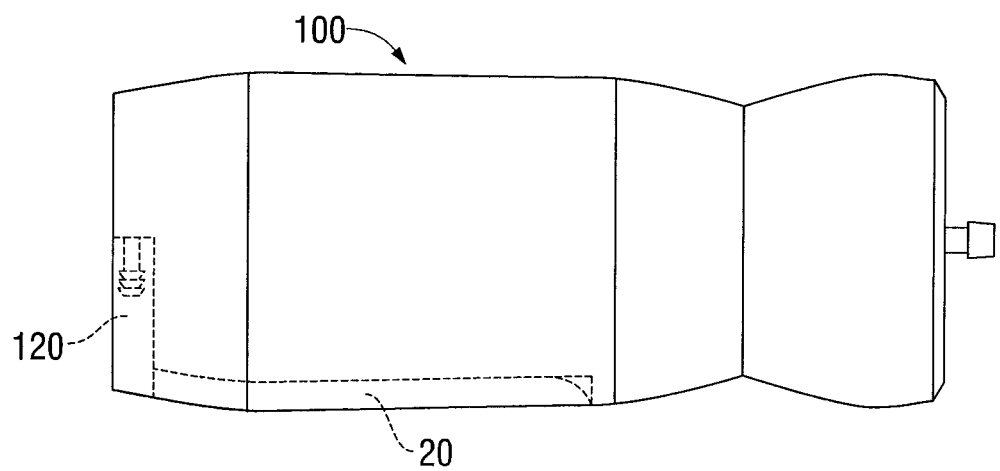
FIG. 8 illustrates one embodiment of the present invention in assembled view.

FIGS. 7 and 8 illustrate on embodiment of the present invention in which the extended wall 45 has been molded into the bottom of the container 15 so as to present itself inside an extension of the groove 120 around the bottom of the container. In this embodiment, the tube 70 would be mechanically connected directly to the extended wall and fed through the groove 20 to the ultimate user.

Although several preferred embodiments of the present invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

The invention claimed is:

1. A portable fluid containment and delivery system comprising:
   a fluid container, comprising;
      a beveled upper portion having a threaded wall extending therefrom;
      an indented middle portion; and
      a beveled lower portion having a threaded wall extending therefrom;
   a removable top having a threaded inner wall configured to couple with said threaded wall of said beveled upper portion, said removable top further comprising a pressure equalizing orifice;
   a removable bottom having a threaded inner wall configured to couple with said threaded wall of said beveled lower portion, said removable bottom further comprising a threaded wall extending from a bottom side of the removable bottom;
   a junction cap having a threaded inner wall configured to couple with said threaded wall extending from the bottom side of the removable bottom;
   an L-shaped tube compression fit between said threaded wall extending from the bottom side of the removable bottom and an end wall of an interior of the junction cap;
   a flexible tube sealingly fit over a distal end of said L-shaped tube;
   a mouth piece configured to extract a fluid from the container located distal from said junction cap; and
   at least one hook and loop attachment for attachment of said flexible tube to an exterior body;

wherein the beveled lower portion comprises a molded indentation extending the length of the beveled lower portion and configured to receive and secure a portion of the flexible tube.

* * * * *